L. B. BOOTH.
APPARATUS FOR DETERMINING ANGULAR ELEVATION OR DEPRESSION OF DISTANT OBJECTS.
APPLICATION FILED DEC. 9, 1920.

1,392,263.

Patented Sept. 27, 1921.
4 SHEETS—SHEET 1.

Inventor
Lionel B. Booth

L. B. BOOTH.
APPARATUS FOR DETERMINING ANGULAR ELEVATION OR DEPRESSION OF DISTANT OBJECTS.
APPLICATION FILED DEC. 9, 1920.

1,392,263.

Patented Sept. 27, 1921.
4 SHEETS—SHEET 4.

Inventor
Lionel B. Booth

Attorney

UNITED STATES PATENT OFFICE.

LIONEL BARTON BOOTH, OF NORTHWOOD, ENGLAND.

APPARATUS FOR DETERMINING ANGULAR ELEVATION OR DEPRESSION OF DISTANT OBJECTS.

1,392,263.　　　　　　Specification of Letters Patent.　　Patented Sept. 27, 1921.

Application filed December 9, 1920. Serial No. 429,525.

*To all whom it may concern:*

Be it known that I, LIONEL BARTON BOOTH, a subject of the King of Great Britain, residing in Northwood, England, have invented certain new and useful Improvements in Apparatus for Determining Angular Elevation or Depression of Distant Objects, of which the following is a specification, an application for the same invention having been filed in Great Britain October 27, 1919.

This invention relates to apparatus for determining angles of elevation or depression of distant objects of the kind in which a bubble is used as a point of reference when a natural horizon is not available as is usually the case, for example, in observations made from aircraft for which the apparatus constituting the present invention is primarily intended.

In order that such observations should be possible it is necessary that there should be no relative movement between the observed image of the bubble and the distant object under observation, and this condition is secured according to the present invention by making the radius of curvature of the curved bubble container sensibly equal to the focal length of a collimating lens or lens system through which it is viewed by the observer. Coincidence of the bubble image with the distant object is obtained by suitable adjustment of a plane glass reflector through which the distant object is viewed directly.

Figure 1:
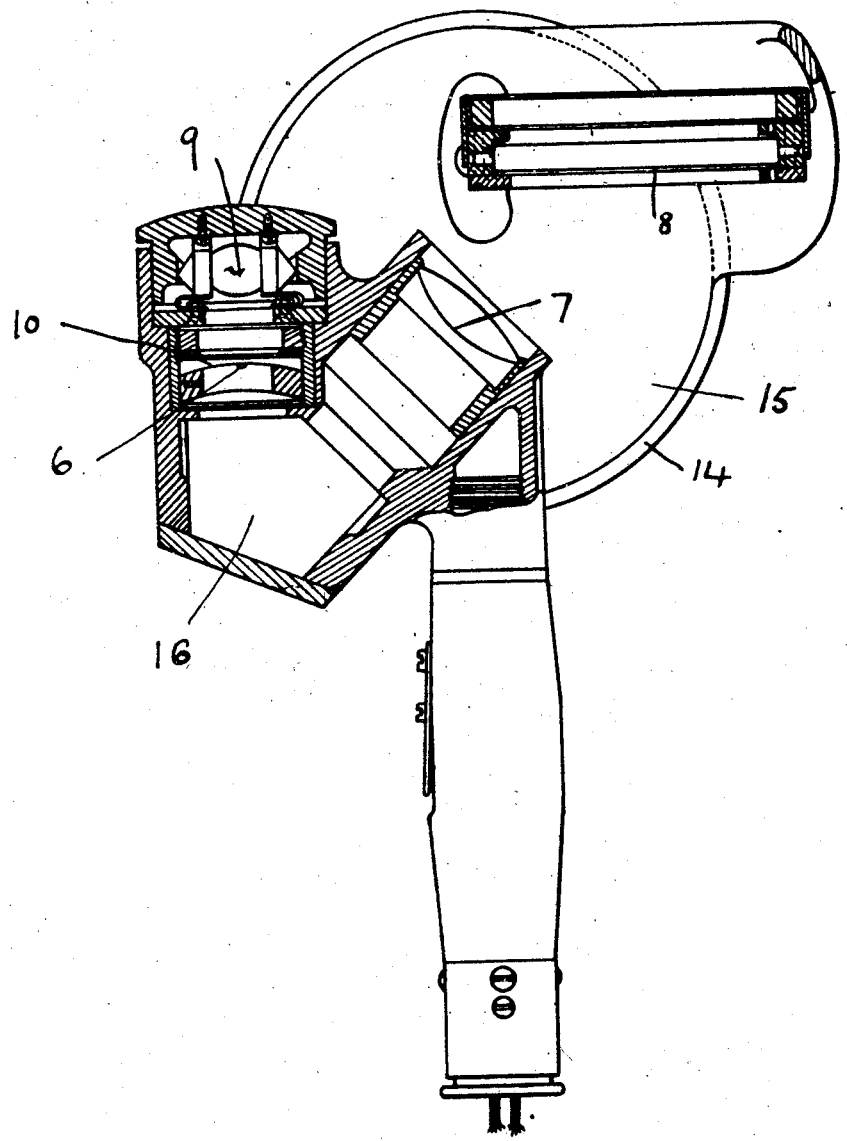
Figure 2:
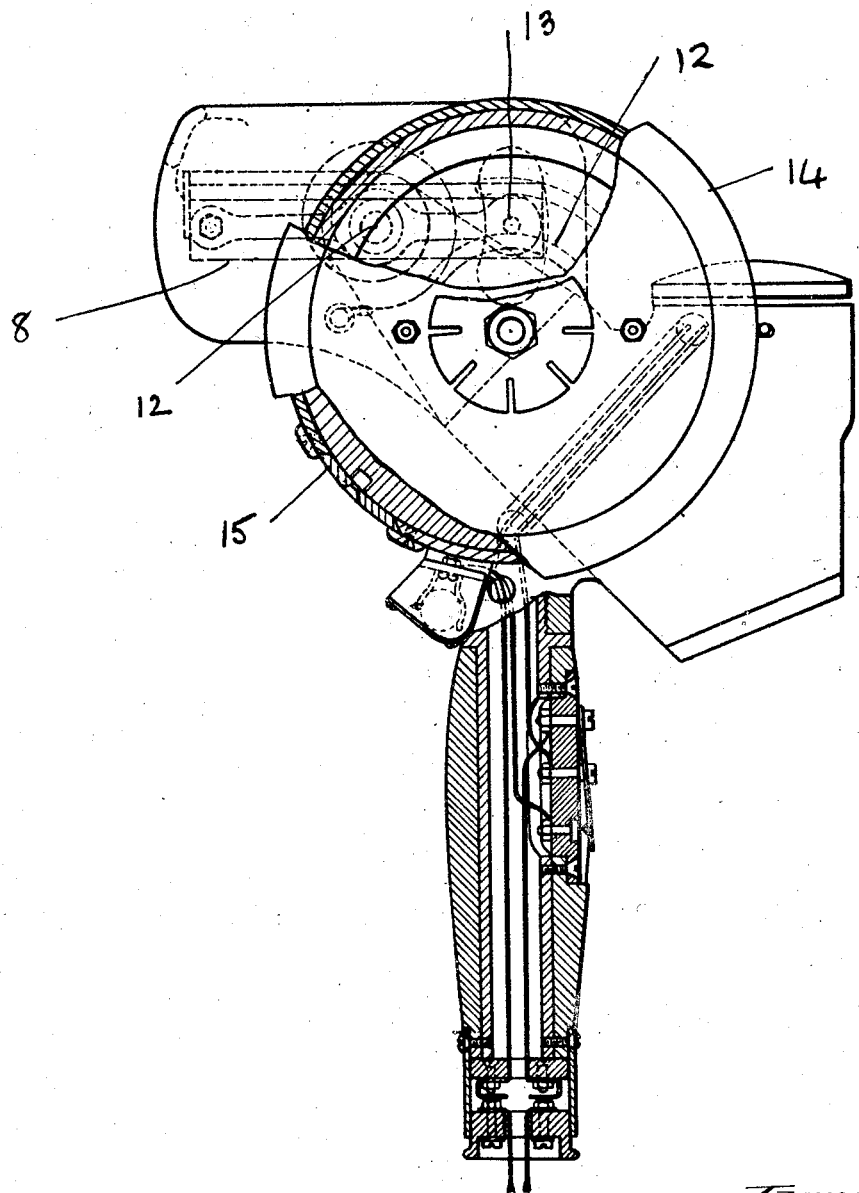
Figure 3:
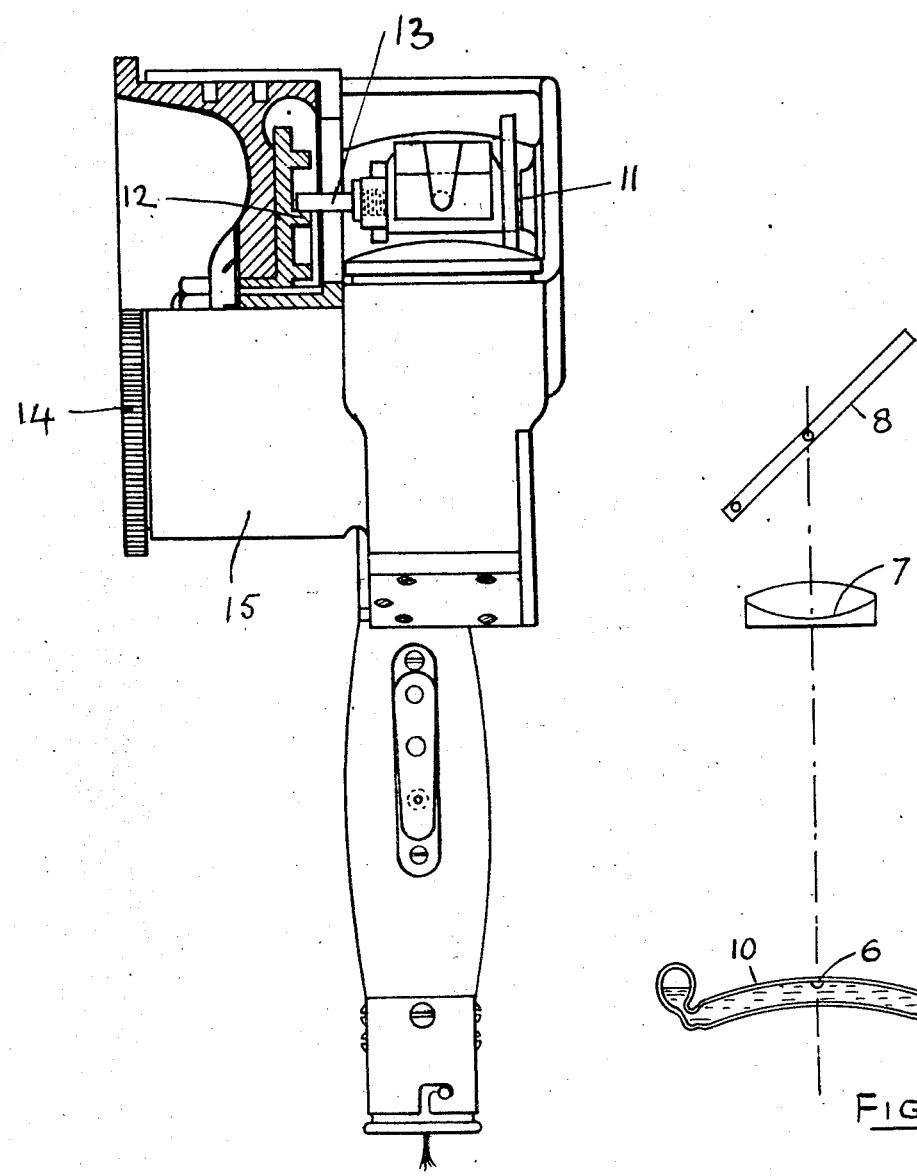
Figure 4:
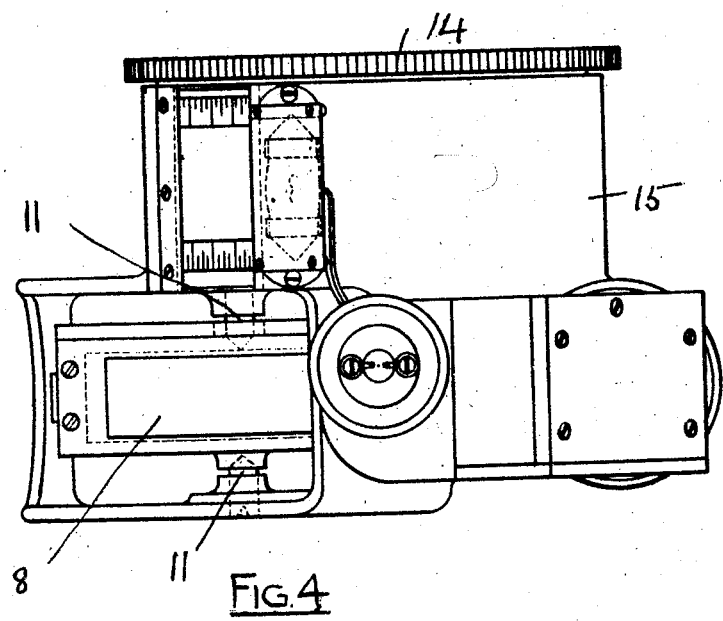
Figure 5:
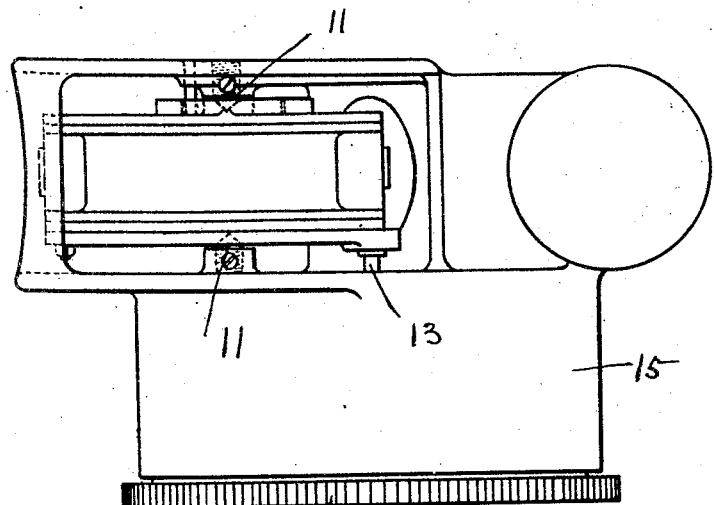

The invention will be more particularly described with reference to the accompanying drawings, wherein Figure 1 is a sectional elevation from one side of one embodiment of the invention; Fig. 2 is a sectional elevation from the other side; Fig. 3 is a sectional rear elevation; Fig. 4 is an under plan; Fig. 5 is a top plan, and Fig. 6 is a diagram showing the essential optical elements of a slightly modified construction.

The numeral 6 indicates the bubble an image of which is projected into the eye by the collimating lens 7 and a plane glass reflector 8 through which latter the sun or star is directly observed. The bubble is illuminated either by the sun in the case of daylight observations, or by an electric lamp 9, which is controlled by a resistance.

The collimating lens is of short focal length and of large aperture to allow of considerable latitude in the position of the eye of the observer when observations are made.

The bubble is in the focal plane of the collimating lens (taking into account the thickness of glass and fluid through which the light passes) and the radius of curvature of the disk 10 retaining the bubble, is appreciably the same as the focal length of the collimating lens (also taking into account the thickness of glass and fluid through which the light passes). This is an essential condition for the bubble and star to remain in coincidence.

The fluid in the bubble container or lens is of very low viscosity, so that the movements of the bubble have no appreciable lag. The size of the bubble may be controlled by any suitable apparatus. The reflector 8 is adjustable to enable the image of the bubble to be brought into coincidence with the object whose elevation is sought, and multiplying gear hereinafter referred to, is provided whereby the angle through which the reflector is adjusted is shown on an enlarged scale.

Beneath the bubble lens is a prism 16 which turns the rays passing through it through a convenient angle of say about 120°. The rays then pass through the collimating lens and are again reflected to the eye, as aforesaid, by a sheet of optically plane parallel glass 8, which may be left plain or partly silvered. The reflector 8 is pivoted about an axis 11 at or near the axis of the objective lens and can be turned through an angle of 45° by a cam 12 engaging a pin 13 projecting from the reflector. The cam is turned by a large milled head 14. The milled head is divided into degrees and fractions and twice the angle through which the plane reflector is turned is read against a datum mark on the case 15 of the apparatus.

In order to make the instrument small and compact, the collimating lens is of short focal length, and its aperture is made large in order to allow of considerable eye freedom. The collimating lens is therefore calculated to be reasonably free from spherical aberration on the axis from coma and from color, taking into account the thickness of the glass of the prism and the lenses and the fluid between it and the bubble.

The axis of the collimating lens is here shown inclined, and the image of the bubble is turned through a considerable angle by a prism. In the case of measuring depression from the horizontal the prism may be dispensed with, as shown in Fig. 6, wherein the axis of the lens is vertical and the bubble vertically underneath the lens. The adjustable reflector, which can be semi-silvered as above stated, will operate in exactly the same manner as described.

The method of operation is obvious. In the case of the altitude of a star, the star is picked up and observed with both eyes, the plane reflector is brought between one eye and the star and in it is seen the image of the bubble. The milled head is turned until the center of the bubble appears to coincide with the star, and the altitude is read directly on a scale rotated by the milled head against the datum mark on the case. Both eyes are used for observing, and since the bubble is optically at infinity and the radius of its container is equal to the focal length of the lens (taking into account the thickness of glass and fluid through which the light passes), movements of the observer cause the star and the bubble to sway about in the field together, but do not separate them.

For observing the sun, an optically plane dark glass, the underside of which is slightly matted to annul confusing reflections of the bubble, is placed over the instrument and one or both eyes may be used. A colored screen is preferably placed between the illuminant and the bubble and a much stronger light is used, or the lamp may be withdrawn and the bubble illuminated by daylight.

Having thus described the nature of the said invention and the best means I know of carrying the same into practical effect, I claim:—

1. An apparatus for determining the angle of elevation or depression of a distant object using a bubble as a point of reference in lieu of a natural horizon, comprising in combination a curved bubble container, a reflector having a transparent portion through which the distant object may be viewed directly, a collimating lens system by which the image of the bubble is thrown on the reflector to be viewed by the observer and having a focal length sensibly equal to the radius of curvature of the bubble container, and means coöperating with the reflector for bringing the bubble image into coincidence with the directly observed distant object.

2. An apparatus for determining the angle of elevation or depression of a distant object using a bubble as a point of reference in lieu of a natural horizon, comprising in combination a curved bubble container, an optically plane glass reflector having a transparent portion interposed between the observer and the distant object, a collimating lens system by which the image of the bubble is thrown upon the reflector and having a focal length sensibly equal to the radius of curvature of the bubble container, and means for adjusting the reflector to bring the reflected bubble image into coincidence with the distant object.

3. An apparatus for determining the angle of elevation or depression of a distant object using a bubble as a point of reference in lieu of a natural horizon, comprising in combination a curved bubble container, an optically plane glass reflector having a transparent portion interposed between the observer and the distant object, a collimating lens system by which the image of the bubble is thrown upon the reflector and having a focal length sensibly equal to the radius of curvature of the bubble container, a prism optically interposed between the bubble container and the collimating lens, and means for adjusting the reflector to bring the reflected bubble image into coincidence with the distant object.

4. An apparatus for determining the angle of elevation or depression of a distant object using a bubble as a point of reference in lieu of a natural horizon, comprising in combination a curved bubble container, a collimating lens system having a focal length sensibly equal to the radius of curvature of the bubble container, and an optically plane glass reflector beyond the collimating lens in the direction of the rays passing therethrough from the bubble and pivoted about an axis substantially at right angles to and intersected by the optical axis of the lens.

5. An apparatus for determining the angle of elevation or depression of a distant object using a bubble as a point of reference in lieu of a natural horizon, comprising in combination a curved bubble container, a collimating lens system having a focal length sensibly equal to the radius of curvature of the bubble container, an optically plane glass reflector located beyond the collimating lens in the direction of the rays passing therethrough from the bubble and having a transparent portion interposed between the observer and the distant object, a casing, a head rotatably mounted in said casing having cam surfaces thereon for adjusting the angular position of the reflector to bring the image of the bubble thrown on the reflector into coincidence with the directly observed distant object and graduations on said head for indicating the extent of such angular movements.

6. An apparatus for determining the angle of elevation or depression of a distant object using a bubble as a point of reference in lieu of a natural horizon, comprising in combination a curved bubble container, a collimating lens system having a focal length sensibly equal to the radius of curvature of the bubble container, and an optically plane glass reflector beyond the collimating lens in the direction of the rays passing therethrough from the bubble and pivoted about an axis substantially at right angles and intersected by the optical axis of the lens, a pin carried by said reflector, and a graduated rotatable head having a cam surface thereon adapted to co-act with said pin for changing the angular position of the reflector and indicating the extent of such angular movement.

7. An apparatus for determining the angle of elevation or depression of a distant object using a bubble as a point of reference in lieu of a natural horizon, comprising in combination a curved bubble container, a collimating lens system having a focal length sensibly equal to the radius of curvature of the bubble container, a prism optically interposed between the bubble container and the collimating lens, an optically plane glass reflector having a transparent portion interposed between the observer and the distant object, means for adjusting the reflector to bring the reflected bubble image into coincidence with the distant object, said means comprising a rotatable head, mechanism interposed between said head and reflector for changing the angular position of the latter in accordance with the movements of said head, and means for indicating the extent of the angular movement of said reflector.

In testimony whereof I have signed my name to this specification.

LIONEL BARTON BOOTH.